United States Patent
Nuzman et al.

(10) Patent No.: US 12,531,047 B2
(45) Date of Patent: Jan. 20, 2026

(54) ACOUSTIC ECHO CANCELLATION

(71) Applicant: Nokia Technologies Oy, Espoo (FI)

(72) Inventors: Carl Nuzman, Murray Hill, NJ (US); Wouter Lanneer, Antwerp (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 329 days.

(21) Appl. No.: 18/314,194

(22) Filed: May 9, 2023

(65) Prior Publication Data
US 2024/0379088 A1    Nov. 14, 2024

(51) Int. Cl.
*G10K 11/178*   (2006.01)
*H04S 3/00*     (2006.01)

(52) U.S. Cl.
CPC .. *G10K 11/17825* (2018.01); *G10K 11/17875* (2018.01); *H04S 3/008* (2013.01); *G10K 2210/3026* (2013.01); *G10K 2210/3028* (2013.01); *G10K 2210/505* (2013.01); *H04S 2400/01* (2013.01)

(58) Field of Classification Search
CPC .. H04M 9/08; H04M 9/082; G10K 11/17825; G10K 11/17875; G10K 2210/3026; G10K 2210/3028; G10K 2210/505; H04S 3/008; H04S 2400/01
See application file for complete search history.

(56) References Cited

U.S. PATENT DOCUMENTS

| | | | |
|---|---|---|---|
| 5,546,459 A | 8/1996 | Sih et al. | |
| 6,718,036 B1 * | 4/2004 | Van Schyndel | H04M 9/082 379/406.01 |
| 8,160,238 B2 | 4/2012 | Cheng et al. | |
| 8,634,547 B2 | 1/2014 | Takahashi | |
| 10,009,477 B2 | 6/2018 | Mani et al. | |
| 10,129,408 B1 * | 11/2018 | Åhgren | H04B 3/237 |
| 2008/0085009 A1 * | 4/2008 | Merks | H04M 9/082 704/E21.007 |

(Continued)

OTHER PUBLICATIONS

Herre et al., "Acoustic Echo Cancellation for Surround Sound using Perceptually Motivated Convergence Enhancement", IEEE International Conference on Acoustics, Speech and Signal Processing—ICASSP '07. Apr. 15-20, 2007, pp. 17-20.

(Continued)

*Primary Examiner* — Jason R Kurr
(74) *Attorney, Agent, or Firm* — ALSTON & BIRD LLP

(57) ABSTRACT

Examples of the disclosure relate to acoustic echo cancellation using adaptive filtering modules. An apparatus for acoustic echo cancellation is configured to process a first input signal using a first acoustic echo cancellation module to obtain a first prediction signal and to process a second input signal using a second acoustic echo cancellation module to obtain a second prediction signal. The first input signal is based on a loudspeaker signal and the second input signal is a delayed first input signal. The prediction signals are processed to obtain a predicted echo signal. The predicted echo signal is applied to a received microphone signal to reduce echo from loudspeaker playback in the received microphone signal. The acoustic echo cancellation modules can be adapted using an adaptive filtering module.

14 Claims, 12 Drawing Sheets

(56) References Cited

U.S. PATENT DOCUMENTS

| | | |
|---|---|---|
| 2013/0216057 A1* | 8/2013 | Thyssen ............... H04M 9/082 |
| | | 381/66 |
| 2015/0187348 A1 | 7/2015 | Kang et al. |
| 2017/0178663 A1* | 6/2017 | Misawa .................. H04R 3/02 |
| 2022/0053268 A1 | 2/2022 | Yun |
| 2023/0046637 A1 | 2/2023 | Nuzman et al. |
| 2023/0051021 A1 | 2/2023 | Nuzman et al. |

OTHER PUBLICATIONS

U.S. Appl. No. 17/898,894, "Adaptive Echo Cancellation", filed Aug. 30, 2022, pp. 1-43.

Extended European Search Report received for corresponding European Patent Application No. 24170723.1, dated Aug. 16, 2024, 8 pages.

Stewart et al., "Adaptive Echo Cancellation for Packet-Based Networks", Telecommunications and Networking, 2004, pp. 516-525.

* cited by examiner

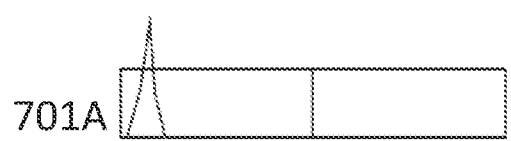
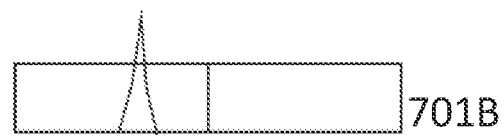
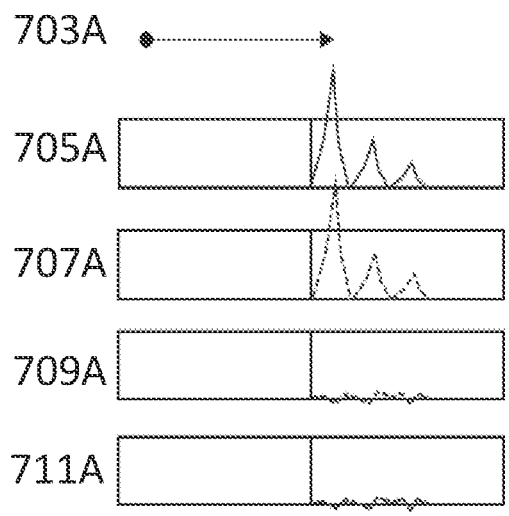
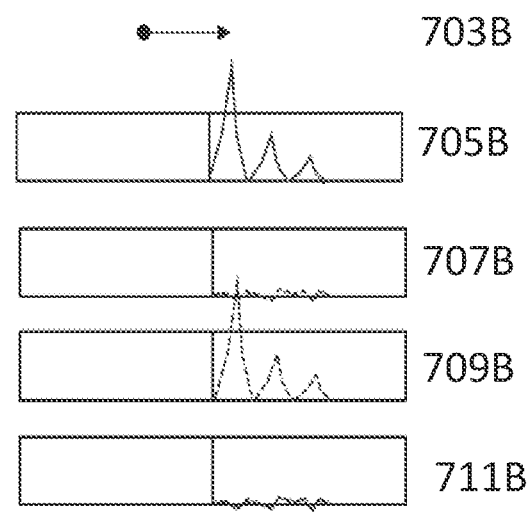
Fig. 7A
Fig. 7B

ACOUSTIC ECHO CANCELLATION

TECHNOLOGICAL FIELD

Examples of the disclosure relate to acoustic echo cancellation. Some relate to acoustic echo cancellation using adaptive filtering modules.

BACKGROUND

Audio capture systems can enable immersive voice applications such as teleconferencing or mediated reality environments. Such systems use simultaneous audio capture and playback to enable real time spatial audio to be transmitted over communications networks. Acoustic echo cancellation is used in such systems to remove acoustic echoes of the loudspeaker signals from the microphone signals. This avoids the loudspeaker echo degrading the quality of the audio captured by the microphones.

BRIEF SUMMARY

According to various, but not necessarily all, examples of the disclosure apparatus for acoustic echo cancellation comprising means for:
  processing a first input signal using a first acoustic echo cancellation module to obtain a first prediction signal, wherein the first input signal is based on a loudspeaker signal;
  processing at least one second input signal using a second acoustic echo cancellation module to obtain a second prediction signal, wherein the at least one second input signal is obtained by delaying the first input signal;
  processing the first prediction signal and the second prediction signal to obtain a predicted echo signal;
  receiving at least one microphone signal;
  applying the predicted echo signal to the received microphone signal to reduce echo from loudspeaker playback in the received microphone signal; and
  adapting the acoustic echo cancellation modules using an adaptive filtering module wherein the adapting of the first acoustic echo cancellation module is based, at least in part, on the predicted echo signal, the received microphone signal, and the first input signal and the adapting of the second acoustic echo cancellation module is based, at least in part, on the predicted echo signal, the received microphone signal, and the second input signal.

The processing of the first prediction signal and the second prediction signal to obtain a predicted echo signal may comprise combining the first prediction signal and the second prediction signal.

The processing of the first prediction signal and the second prediction signal to obtain a predicted echo signal may comprise selecting a prediction signal.

The means may be for processing the first input signal and the second input signal in parallel.

The first acoustic echo cancellation module may comprise a first set of sub-band filters and the second acoustic echo cancellation module may comprise a second set of sub-band filters.

The means may be for obtaining a sub-band sequence of the first input signal and processing the sub-band sequence of the first input signal using a sub-band filter from the first set of sub-band filters and obtaining a sub-band sequence of the second input signal and processing the sub-band sequence of the second input signal using a sub-band filter from the second set of sub-band filters.

The means may be for using a first transform to transform the first input signal into the sub-band sequence of the first input signal and using a second transform to transform the second input signal into the sub-band sequence of the second input signal.

The sub-band filters may be based on at least one of:
  adaptive weighted overlap add filter-banks;
  short time Fourier transforms The at least one second input signal may be delayed by half a frame of the acoustic echo cancellation module compared to the first input signal.

The means may be for obtaining a plurality of second input signals wherein different delays are used for the different second input signals.

The first acoustic echo cancellation module may comprise a larger number of coefficients than the second acoustic echo cancellation module.

The means may be for decorrelating the first input signal and the at least one second input signal before the respective signals are provided to the respective acoustic echo cancellation modules.

The loudspeaker signal may comprise a multi-channel signal.

According to various, but not necessarily all, examples of the disclosure there may be provided a method comprising:
  processing a first input signal using a first acoustic echo cancellation module to obtain a first prediction signal, wherein the first input signal is based on a loudspeaker signal;
  processing at least one second input signal using a second acoustic echo cancellation module to obtain a second prediction signal, wherein the at least one second input signal is obtained by delaying the first input signal;
  processing the first prediction signal and the second prediction signal to obtain a predicted echo signal;
  receiving at least one microphone signal;
  applying the predicted echo signal to the received microphone signal to reduce echo from loudspeaker playback in the received microphone signal; and
  adapting the acoustic echo cancellation modules using an adaptive filtering module wherein the adapting of the first acoustic echo cancellation modulation is based, at least in part, on the predicted echo signal, the received microphone signal, and the first input signal and the adapting of the second acoustic echo cancellation modulation is based, at least in part, on the predicted echo signal, the received microphone signal, and the second input signal.

According to various, but not necessarily all, examples of the disclosure there may be provided a computer program comprising instructions which, when executed by an apparatus, cause the apparatus to perform at least:
  processing a first input signal using a first acoustic echo cancellation module to obtain a first prediction signal, wherein the first input signal is based on a loudspeaker signal;
  processing at least one second input signal using a second acoustic echo cancellation module to obtain a second prediction signal, wherein the at least one second input signal is obtained by delaying the first input signal;
  processing the first prediction signal and the second prediction signal to obtain a predicted echo signal;
  receiving at least one microphone signal;

applying the predicted echo signal to the received microphone signal to reduce echo from loudspeaker playback in the received microphone signal; and adapting the acoustic echo cancellation modules using an adaptive filtering module wherein the adapting of the first acoustic echo cancellation modulation is based, at least in part, on the predicted echo signal, the received microphone signal, and the first input signal and the adapting of the second acoustic echo cancellation modulation is based, at least in part, on the predicted echo signal, the received microphone signal, and the second input signal.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which:

FIGS. 7A and 7B show propagation of a speaker impulse through an acoustic echo cancellation system;

Figure 1:
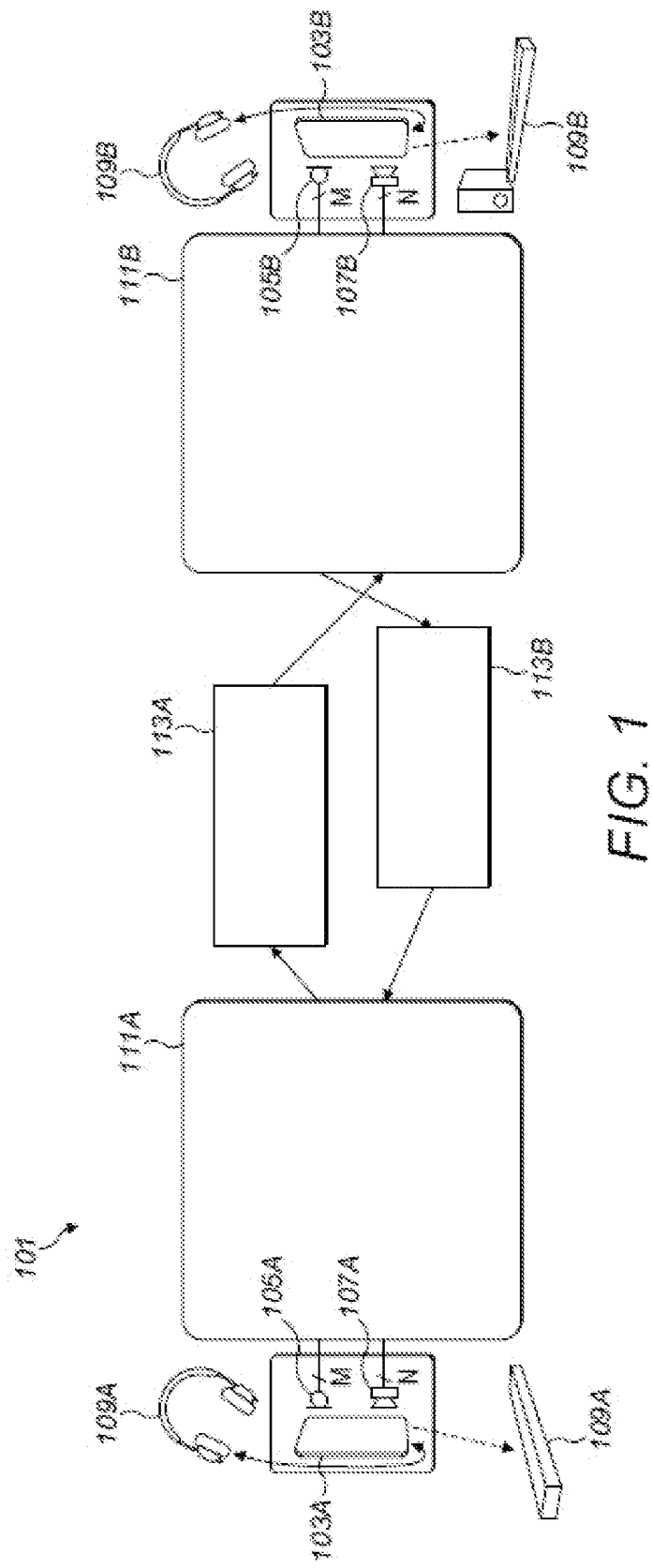
FIG. 1 shows an example system.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

FIG. 1 shows an example system 101 that could use acoustic echo cancellation and could be used to implement examples of the disclosure. Other systems and variations of this system 101 could be used in other examples. The system 101 can be used for voice or other types of audio communications. Audio from a near end user can be detected, processed and transmitted for rendering and playback to a far end user. In some examples, the audio from a near-end user can be stored in an audio file for later use.

The system 101 comprises a first user device 103A and a second user device 103B. In the example shown in FIG. 1 each of the first user device 103A and the second user device 103B comprise mobile telephones. Other types of user devices 103 could be used in other examples of the disclosure. For example, the user devices 103 could be a telephone, a camera, a computing device, a teleconferencing device, a television, a Virtual Reality (VR)/Augmented Reality (AR) device or any other suitable type of communications device.

The user devices 103A, 103B comprise one or more microphones 105A, 105B and one or more loudspeakers 107A, 107B. The one or more microphones 105A, 105B are configured to detect acoustic signals and convert acoustic signals into output electrical audio signals. The output signals from the microphones 105A, 105B can provide a near-end signal. The one or more loudspeakers 107A, 107B are configured to convert an input electrical signal to an output acoustic signal that a user can hear.

The user devices 103A, 103B can also be coupled to one or more peripheral playback devices 109A, 109B. The playback devices 109A, 109B could be headphones, loudspeaker set ups or any other suitable type of playback devices 109A, 109B. The playback devices 109A, 109B can be configured to enable spatial audio, or any other suitable type of audio to be played back for a user to hear. In examples where the user devices 103A, 103B are coupled to the playback devices 109A, 109B the electrical audio input signals can be processed and provided to the playback devices 109A, 109B instead of to the loudspeaker 107A, 107B of the user device 103A, 103B.

Figure 13:
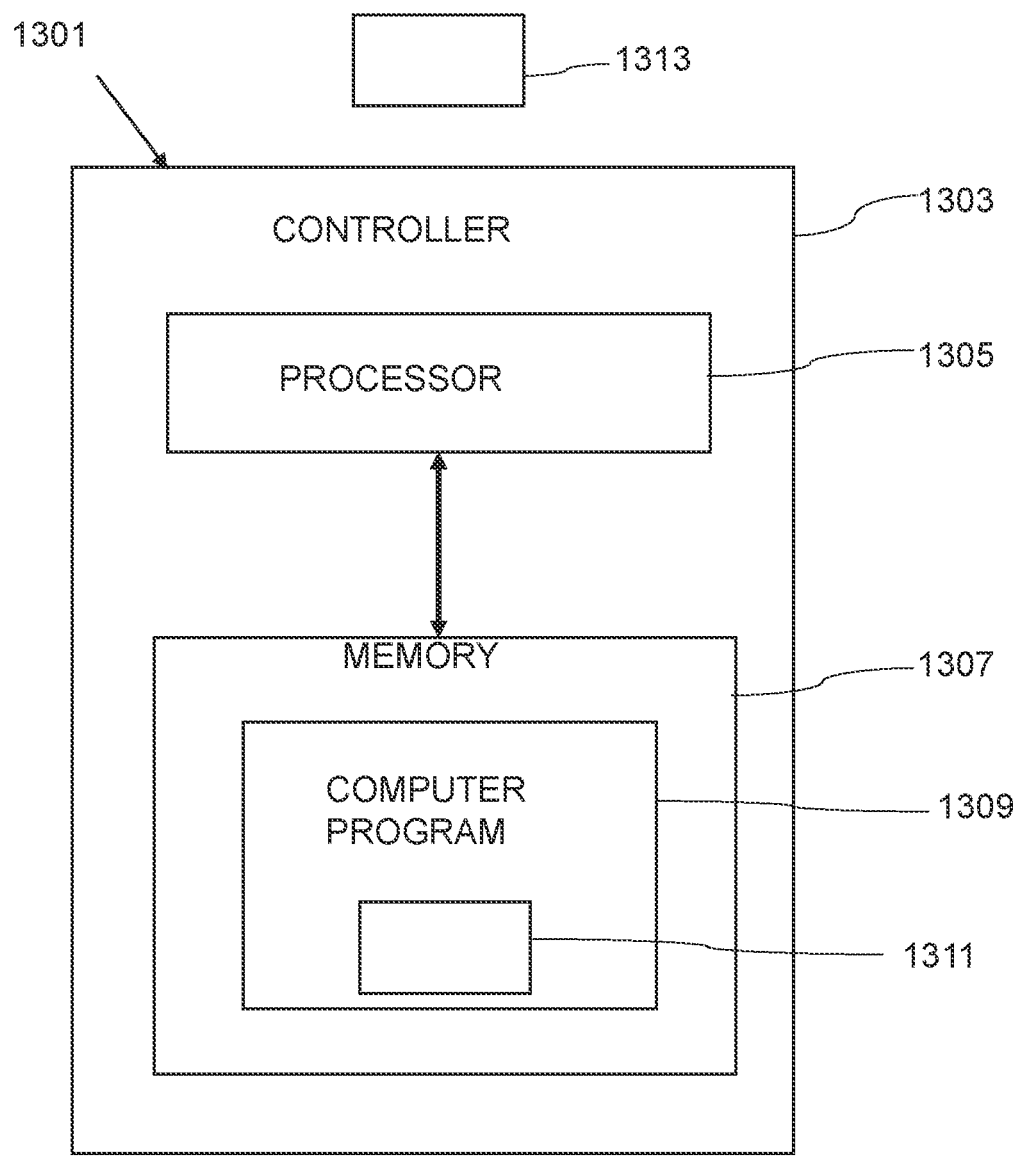
FIG. 13 shows an example apparatus.

The user devices 103A, 103B also comprise processing means 111A,111B. The processing means 111A,111B can comprise any means suitable for processing audio signals detected by the microphones 105A, 105B and/or processing means 111A,111B configured for processing audio signals provided to the loudspeakers 107A, 107B and/or playback devices 109A, 109B. The processing means 111A,111B could comprise one or more apparatus as shown in FIG. 13 and described below or any other suitable means.

The processing means 111A,111B can be configured to perform any suitable processing on the audio signals. For example, the processing means 111A,111B can be configured to perform acoustic echo cancellation, spatial capture, noise reduction, dynamic range compression and/or any other suitable process on the signals captured by the microphones 105A, 105B. The processing means 111A,111B can be configured to perform spatial rendering and dynamic range compression on input electrical signals for the loudspeakers 107A, 107B and/or playback devices 109A, 109B. The processing means 111A,111B can be configured to perform other processes such as active gain control, source tracking, head tracking, audio focusing, or any other suitable process.

The processed audio signals can be transmitted between the user devices 103A, 103B using any suitable communication networks. In some examples the communication networks can comprise 5G or other suitable types of networks. The communication networks can comprise one or more codecs 113A, 113B which can be configured to encode and decode the audio signals as appropriate. In some examples the codecs 113A, 113B could be IVAS (Immersive Voice Audio Systems) codecs or any other suitable types of codec.

Figure 2:
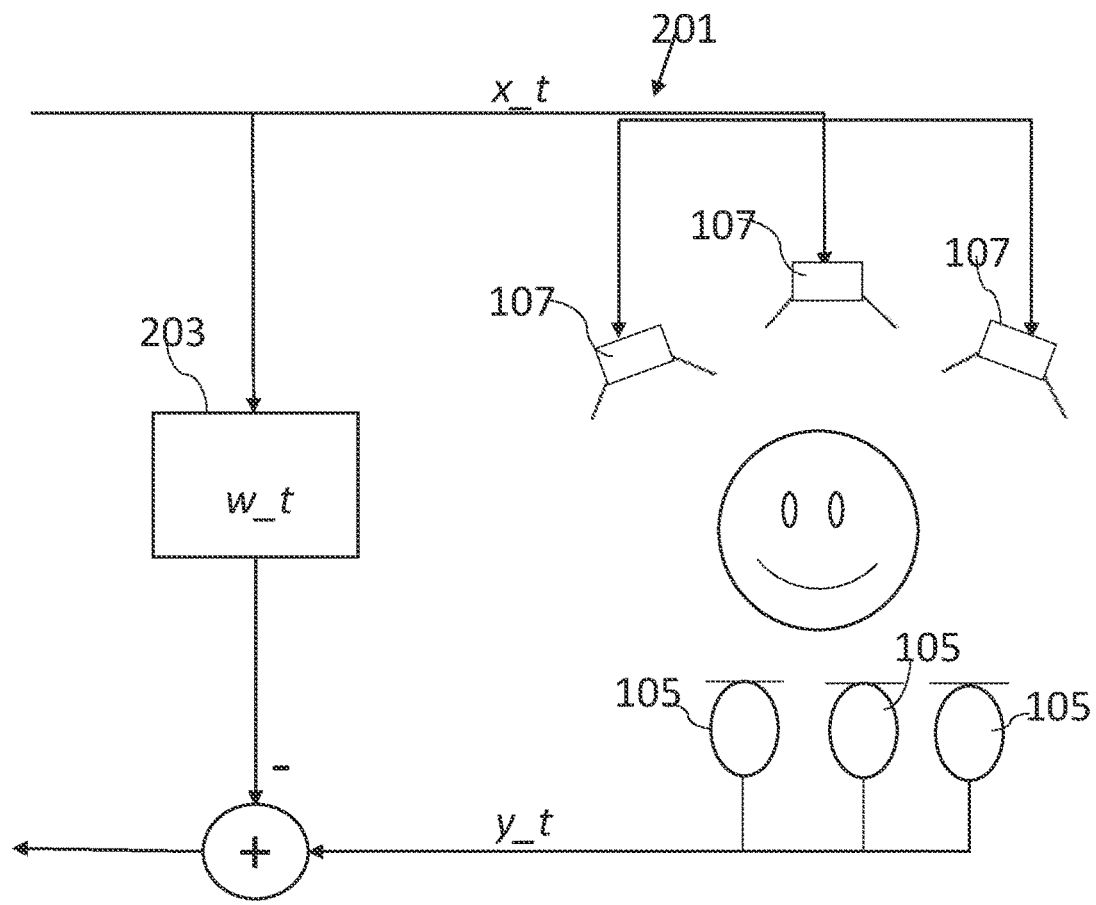
FIG. 2 shows an example acoustic echo cancellation system.

FIG. 2 schematically shows an example acoustic echo cancellation system 201. The acoustic echo cancellation system 201 is an audio system that supports two-way communication and makes use of acoustic echo cancellation. The example acoustic echo cancellation system 201 can be provided within a user device 103. The user device 103 can comprise one or more loudspeakers 107 and one or more microphones 105. The user device 103 could be part of a system 101 as shown in FIG. 1.

In the example of FIG. 2 the acoustic echo cancellation system 201 comprises three loudspeakers 107 and three microphones 105. The acoustic echo cancellation system 201 could comprise any number of loudspeakers 107 and/or microphones 105. In some examples one or more playback devices 109 could be used in place of, or in addition to the loudspeakers 107.

The acoustic echo cancellation system 201 is configured so that a loudspeaker signal $x\_t$ is provided to the loudspeakers 107. The loudspeaker signal $x\_t$ is configured to control the loudspeakers 107 to generate audio.

The microphones 105 are configured to detect acoustic signals. The microphones 105 provide an electrical microphone signal $y\_t$ as an output where the microphone signal $y\_t$ is based on the detected acoustic signals.

An echo channel exists between the loudspeakers 107 and the microphones 105. The echo channel can cause audio from the loudspeakers 107 to be detected by the microphones 105. This can create an unwanted echo within the microphone signals $y\_t$. The microphone signals $y\_t$ that are provided by the microphones 105 can therefore comprise multiple components. The microphone signals $y\_t$ can comprise a near-end component, a noise component and an echo of the loudspeaker signal and/or any other components.

The acoustic echo cancellation system 201 comprises an acoustic echo cancellation module 203 that is configured to reduce the echo of the loudspeaker signal $x\_t$ in the microphone signals $y\_t$. The acoustic echo cancellation module 203 is configured to reduce the effect of the loudspeaker signal $x\_t$ in the received microphone signals $y\_t$. The acoustic echo cancellation module 203 is configured to reduce echo from loudspeaker playback in the received microphone signals $y\_t$.

The acoustic echo cancellation system 201 is configured so that the loudspeaker signal $x\_t$ is provided as an input to an acoustic echo cancellation module 203. The acoustic echo cancellation module 203 is configured to predict a signal corresponding to the echo. The acoustic echo cancellation system 201 is configured so that the acoustic echo cancellation module 203 receives the loudspeaker signal $x\_t$ as an input and provides a predicted echo signal as an output.

The echo cancellation module 203 can be an adaptive module. The echo cancelation module can be adapted using an adaptive filtering module or any other suitable means.

The echo cancellation module 203 can comprise a set of sub-band filters. The sub-band filters can be configured to process sub-band sequences of the time-domain input signals. The sub-band-filters can be based on weighted overlap add (WOLA) filter banks or can be based on Short Time Fourier Transforms (STFT) or any other suitable type of filter bank. The set of sub-band sequences in the STFT domain are obtained by applying the WOLA filter-banks to the time-domain input signals, which are subsequently processed by the sub-band filters.

The predicted echo signal provided as the output from the acoustic echo cancellation module 203 can be subtracted from the microphone signals. This would ideally leave only the near end signal in the output from the acoustic echo cancellation system 201.

For instance, by removing the unwanted echo the output of the acoustic echo cancellation system 201 could comprise just the voice inputs from a near end user.

Sub-band filters, based on for example WOLA filterbanks, are suitable for use in the acoustic echo cancellation modules 203 because they have a low computational complexity. The low computational complexity arises because such approaches can make use of low complexity transforms such as fast Fourier Transforms.

The sub-band filters process time-domain samples in blocks. The blocks are referred to as frames. As an example, a frame could comprise 240 samples, corresponding to 5 ms at 48 KHz sampling rate. In one iteration of the echo cancellation module 203, one frame of loudspeaker signals $x\_t$ and one frame of microphone signals $y\_t$ are received as input, and the acoustic echo cancellation system 201 will produce one frame of samples with reduced echo as an output.

However, the sub-band filters suffer from sensitivity to any difference in time alignment between the speaker and microphone frame boundaries with respect to the peak delay of the echo impulse response. Due to aliasing effects in the WOLA filter-bank, the achievable performance of the acoustic echo cancellation system 201 depends, to some extent, on how the frame boundaries of the filter-banks in the acoustic echo cancellation module align with the location of the dominant peaks of the time-domain impulse response of the echo channel.

For example, if the peak time-domain response occurs at or near a frame boundary, then the acoustic echo cancellation system 201 will perform well. The performance of the acoustic echo cancellation system 201 can be measured using echo return loss enhancement (ERLE). The ERLE is usually measured in dB. The ERLE quantifies the extent to which the echo of the loudspeaker signal $x\_t$ is reduced in strength at the output of the acoustic echo cancellation system 201 compared with the strength of the echo of the loudspeaker signal $x\_t$ in the microphone signal $y\_t$. When the acoustic echo cancellation system 201 is performing well the ERLE will be high.

However, if the peak time-domain response occurs in the center of a frame, the acoustic echo cancellation system 201 will perform poorly. This will result in a low ERLE. This can also result in the far end user hearing echoes in their output signals. For example, it could result in the far end user hearing echoes of their own speech. This can reduce the quality of experience for the users. Having a low ERLE can also cause other issues. For example, a low ERLE can interfere with other signal processing modules in a system 101 such as modules configured for capturing directional or spatial information.

Figures 3A, 3B:
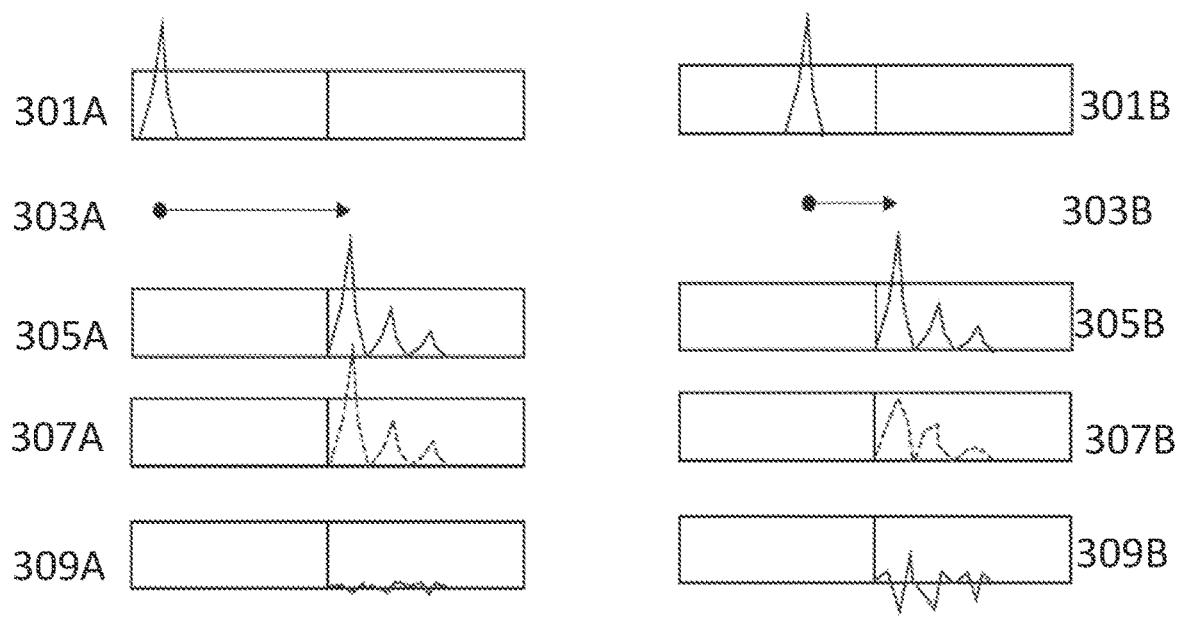
FIGS. 3A and 3B show propagation of a loudspeaker impulse through an acoustic echo cancellation system.

FIGS. 3A and 3B show propagation of a loudspeaker impulse through acoustic echo cancellation systems 201. FIG. 3A shows the propagation of a loudspeaker impulse through an acoustic echo cancellation system 201 having a first physical delay and FIG. 3B shows the propagation of a loudspeaker impulse through an acoustic echo cancellation system 201 having a second physical delay where the first and second physical delays are different lengths. This illustrates the problem of robustness to channel delays of different lengths.

FIGS. 3A and 3B show a loudspeaker signal 301A, 301B, a physical delay 303A, 303B, a microphone signal 305A, 305B, a predicted microphone signal 307A, 307B and a residual echo 309A, 309B for each of the respective acoustic echo cancellation systems 201.

The WOLA filter-bank based sub-band filters of the acoustic echo cancellation system 201 in the examples of FIGS. 3A and 3B have a frame length of 5 ms. Other lengths of the frames could be used in other examples. The frames are indicated by the rectangles in FIGS. 3A and 3B.

In FIG. 3A the acoustic echo cancellation system 201 has a physical delay of 5 ms. This is the same as the frame length so an impulse at the beginning of a frame in the loudspeaker signal 301A arrives at the beginning of a frame in the microphone signal 305A. The sub-band filters of an acoustic echo cancellation module 203 can predict the microphone signal very accurately because the impulses are at the same locations within the frames. In the example of FIG. 3A the predicted microphone signal 307A is very similar to the microphone signal 305A. The residual echo 309A is obtained by subtracting the predicted microphone signal 307A from the microphone signal 305A. In this case the predicted microphone signal 307A is very similar to the microphone signal 305A so the resulting residual echo 309A is very small. In this case the acoustic echo cancellation system 201 is performing well and will have a high ERLE.

In FIG. 3B the acoustic echo cancellation system 201 has a physical delay of 2.5 ms. This is not the same as the frame length. This is about half a frame length so an impulse in the middle of a frame in the loudspeaker signal 301B arrives at the beginning of a frame in the microphone signal 305B. The impulses are in different locations within the frames and aliasing effects prevent the sub-band filters of the acoustic echo cancellation module 203 from predicting the microphone signal very accurately. In the example of FIG. 3B the predicted microphone signal 307B is different from the microphone signal 305B. In this case the resulting residual echo 309B is significant because the predicted microphone signal 307B is not very similar to the microphone signal 305B. In this case the acoustic echo cancellation system 201 is not performing well and will have a low ERLE.

Figure 4:
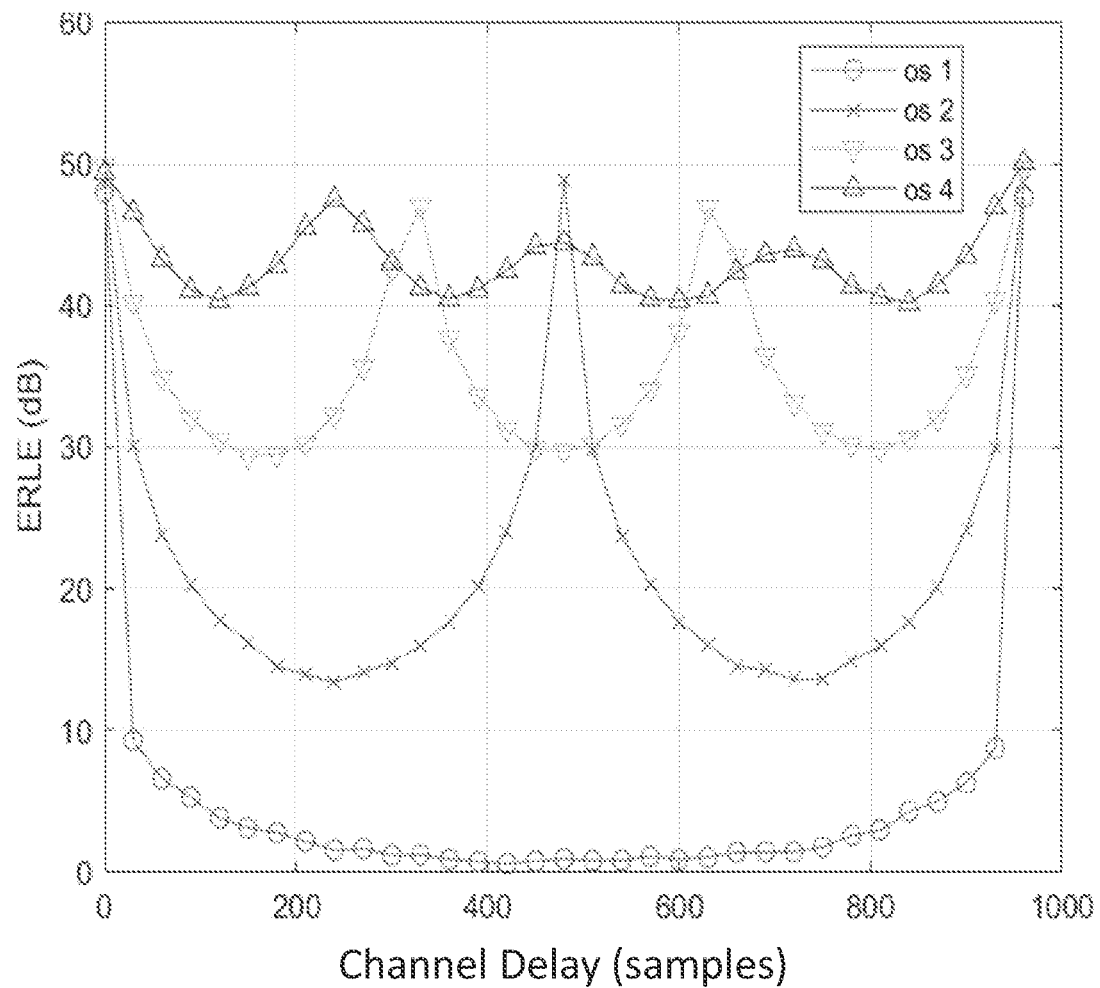
FIG. 4 shows a plot pf ERLE performance for an acoustic echo cancellation system.

FIG. 4 shows a plot of ERLE performance for an acoustic echo cancellation system 201 that uses WOLA filter-bank based sub-band filters. The plot in FIG. 4 shows how the ERLE achieved by the acoustic echo cancellation system 201 varies with the length of the total echo channel delay in an idealized scenario. The total echo channel delay comprises the physical propagation delay and other system delays, such as buffering.

In the example of FIG. 4 the WOLA FFT size is N=960 samples. The plots are obtained using four different oversampling factors Ω of {1,2,3,4}. The corresponding frame sizes L=N/Ω are {960, 480, 320, 240}, respectively. In this idealized scenario the echo channel is a pure delay, with delay varying from 0 to 960 samples, and the noise is 50 dB lower than the echo level, allowing a maximum of 50 dB ERLE.

FIG. 4 shows the ERLE achieved by using four different oversampling factors as a function of the channel delay. When the delay is a multiple of the frame length, excellent ERLE can be achieved. This occurs at the delays of 0 and 960 for oversampling factor 1, at delays of 0, 480, and 960 for oversampling factor 2, at delays of 0, 320, 640, and 960 for oversampling factor 3, and at delays of 0, 240, 480, 720, 960 for oversampling factor 4. When the delay is not an integer multiple of the frame length, the ERLE performance drops significantly due to aliasing affects. The worst ERLE performance occurs at a delay equal to half of the frame length. The variation in ERLE is less severe or better for implementations with higher oversampling, at the cost of higher complexity.

FIG. 4 therefore shows that the performance of an acoustic echo cancellation system 201 is good if the dominant delay lines up with a frame boundary, and is poor if it aligns at the center of a frame. As an example, a system 101 such as the system 101 of FIG. 1 can be designed to use frames of 480 samples and an oversampling factor of 2 to keep complexity low. In scenarios where the echo channel is close to a multiple of 480 samples, the acoustic echo cancellation system 201 will suppress the residual echo very strongly. This will result in clear, immersive communication. In scenarios where the echo channel is not close to a multiple of 480 samples, the acoustic echo cancellation system 201 will not suppress the residual echo very strongly. This will result in audible echo artifacts for the far-end user, and low quality of experience.

Examples of the disclosure increase the robustness of acoustic echo cancellation systems 201 by addressing this issue with the alignment of the delays and the frame boundaries.

Figure 5:
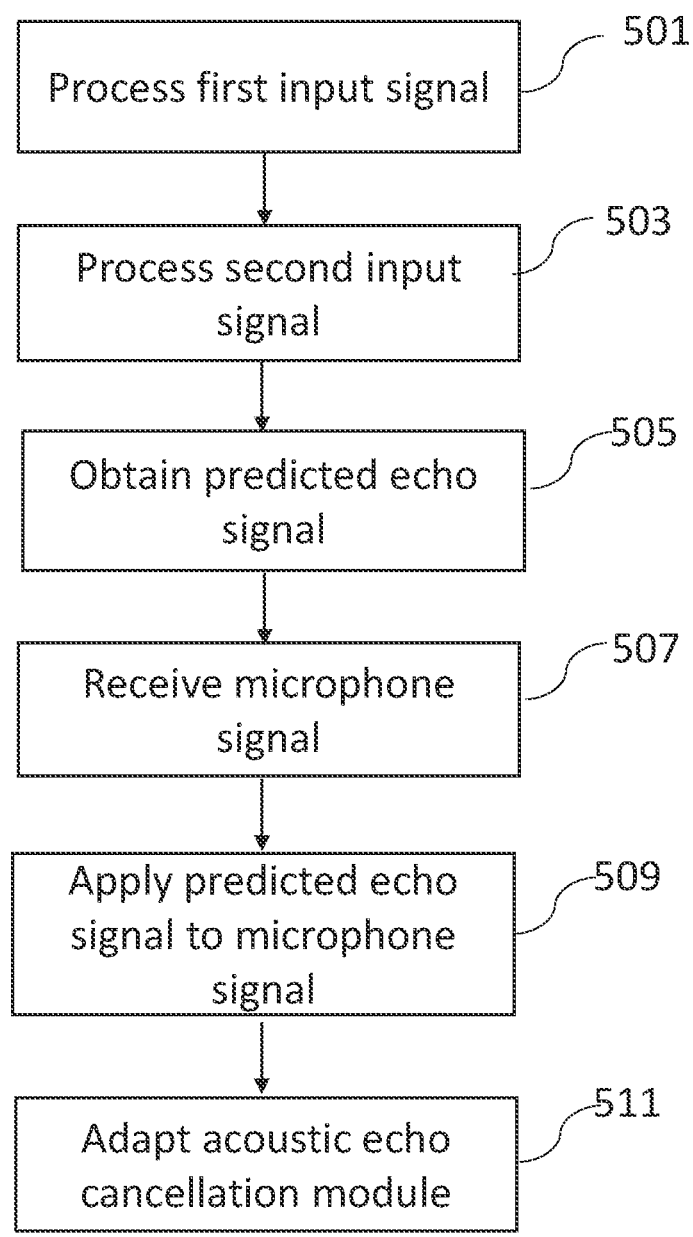
FIG. 5 shows an example method.

FIG. 5 shows an example method. The method could be implemented using an apparatus such as the apparatus of FIG. 13, a user device 103 as shown in FIG. 1 and/or any other suitable means The method comprises, at block 501, processing a first input signal using a first acoustic echo cancellation module 203 to obtain a first prediction signal. The first input signal is based on a loudspeaker signal x_t. The loudspeaker signal x_t can comprise a multi-channel signal. The multi-channel loudspeaker signal can be reproduced by multiple loudspeakers.

The first acoustic echo cancellation module 203 can comprise a first set of sub-band filters. The method can comprise obtaining a sub-band sequence of the first input signal and processing the sub-band sequence of the first input signal using a sub-band filter from the first set of sub-band filters. A first transform can be used to transform the first input signal into the sub-band sequence of the first input signal.

The method also comprises, at block 503, processing at least one second input signal using a second acoustic echo cancellation module 203 to obtain a second prediction signal. The at least one second input signal is obtained by delaying the first input signal. The second input signal can be a delayed loudspeaker signal x_t.

The second acoustic echo cancellation module 203 can comprise a second set of sub-band filters. The second set of sub-band filters can be separate to, and different from, the first set of sub-band filters. The method can comprise obtaining a sub-band sequence of the second input signal and processing the sub-band sequence of the second input signal using a sub-band filter from the second set of sub-band filters. A second transform can be used to transform the second input signal into the sub-band sequence of the second input signal.

The sub-band filters that are used for the respective acoustic echo cancellation modules 203 can be based on adaptive weighted overlap add (WOLA) filter-banks, short time Fourier transforms (STFT) or any other suitable type of filter-banks.

The second input signal is obtained by delaying the first input signal. The second input signal can be delayed by any suitable time. In some examples the second input signal is delayed by half a frame of the acoustic echo cancellation module 203 compared to the first input signal. The size of the delay that is added can be determined by the number of second input signals that are obtained. In some examples a plurality of different second input signals can be obtained. If a plurality of second input signals are obtained then different delays can be used for the respective second input signals. In some examples two different second input signals are obtained by delaying the first input signal with ⅓th and ⅔th of a frame of the acoustic echo cancellation module 203 respectively.

At block 505 the method comprises processing the first prediction signal and the second prediction signal to obtain a predicted echo signal. Any suitable process can be used to obtain the predicted echo signal. In some examples the processing of the first prediction signal and the second prediction signal to obtain a predicted echo signal can comprise combining the first prediction signal and the second prediction signal. In some examples the processing of the first prediction signal and the second prediction signal to obtain a predicted echo signal comprises selecting a prediction signal. For example, the prediction signal that results in the lowest echo in the output signal could be selected from two more propose prediction signals.

At block 507 the method comprises receiving at least one microphone signal y_t. The microphone signal y_t can be detected by one or more microphones 105.

At block 509 the method comprises applying the predicted echo signal to the received microphone signal y_t to reduce echo from loudspeaker playback in the received microphone signal y_t. In some examples the predicted echo signal can be subtracted from the received microphone signal y_t. The method can comprise obtaining a sub-band sequence of the received microphone signal y_t and processing the sub-band sequence of the received microphone signal y_t by subtracting the sub-band sequence from the predicted echo signal. A third transform can be used to transform the received microphone input signal into the sub-band sequence of the received microphone signal.

The application of the predicted echo signal to the received microphone signal y_t can result in an output signal comprising the near-end component and a noise component of the microphone signal y_t because the echo component has been removed, or substantially removed.

At block 511 the method comprises adapting the acoustic echo cancellation modules 203 using an adaptive filtering module. The adapting of the first acoustic echo cancellation module 203 is based, at least in part, on the predicted echo signal, the received microphone signal, and the first input signal. The adapting of the second acoustic echo cancellation module 203 is based, at least in part, on the predicted echo signal, the received microphone signal y_t, and the second input signal. The adapting can be based on the sub-band sequences of the respective signals.

The blocks of the method of FIG. 5 could be performed in a different sequence to that shown in FIG. 5. For instance, in FIG. 5 the processing of the second input signal is shown as following the processing of the first input signal. In examples of the disclosure the first input signal and the second input signal could be processed in parallel.

The respective acoustic echo cancellation modules 203 do not need to be the same. In some examples the first acoustic echo cancellation module 203 can comprise a larger number of coefficients than the second acoustic echo cancellation module 203. For instance, the filters used in the first acoustic echo cancellation module can be long enough to capture the entire time duration of an echo impulse response while the filters of a second acoustic echo cancellation module 203B might only be long enough to capture the strongest portion of the echo impulse response. Using some shorter filters can reduce the complexity of the acoustic echo cancellation system. Another example would be to use finite impulse response (FIR) sub-band filters for the first acoustic echo cancellation module 203A and infinite impulse response (IIR) sub-band filters for the second acoustic echo cancellation module.

In some examples the method can comprise additional blocks that are not shown in FIG. 5. For instance, in some examples the first input signal and the at least one second input signal can be decorrelated before the respective signals are provided to the respective acoustic echo cancellation modules 203.

Figure 6:
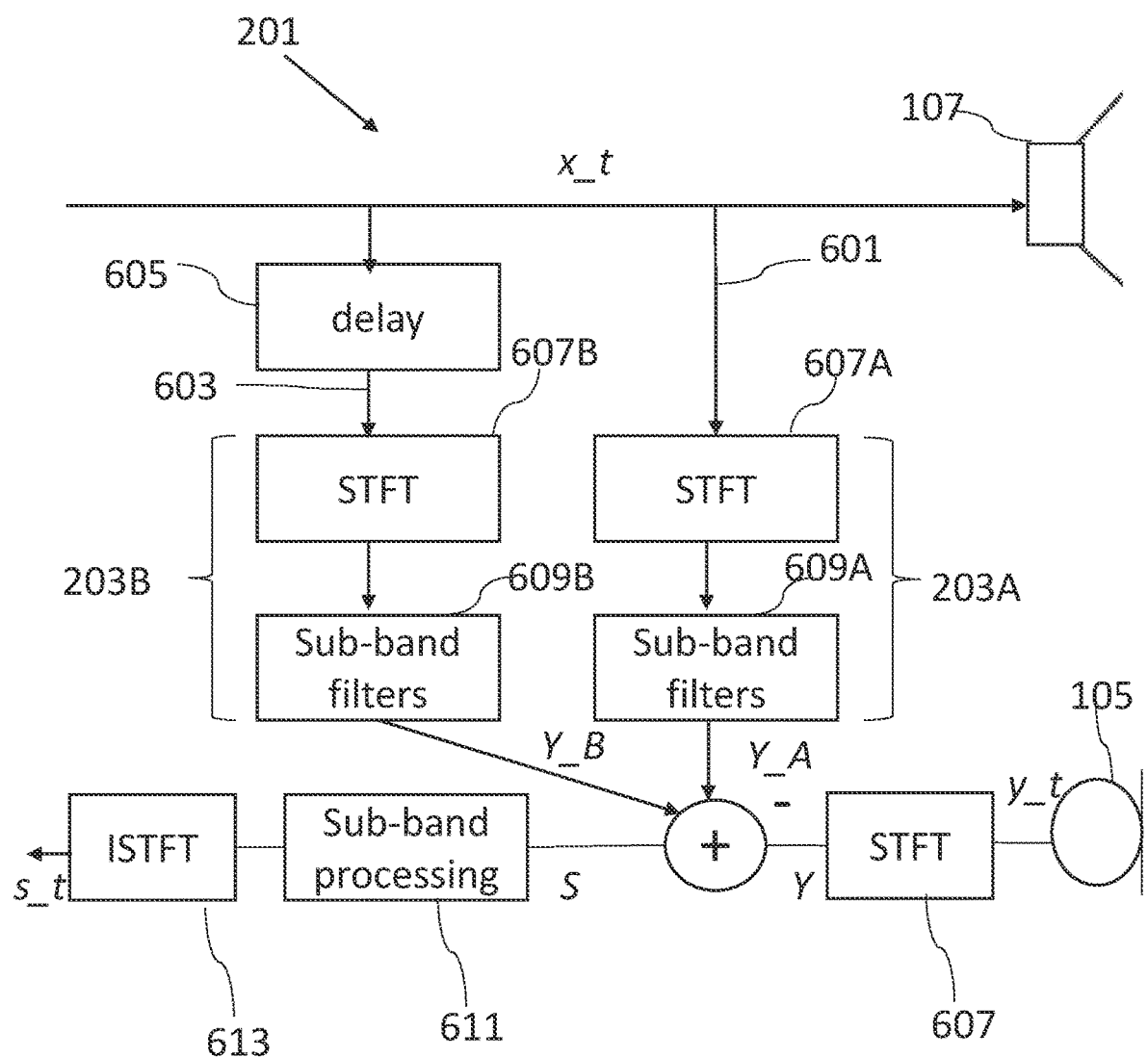
FIG. 6 shows an example acoustic echo cancellation system.

FIG. 6 schematically shows an example acoustic echo cancellation system 201 according to examples of the disclosure. The example acoustic echo cancellation system 201 can be provided within a user device 103. The user device 103 can comprise one or more loudspeakers 107 and one or more microphones 105. The user device 103 could be part of a system 101 as shown in FIG. 1 or could be part of any other suitable system.

The acoustic echo cancellation system 201 is configured so that a loudspeaker signal x_t is provided to a loudspeaker 107. The loudspeaker signal x_t is configured to control the loudspeakers 107 to generate audio. In the example of FIG. 6 only one loudspeaker 107 is shown however the acoustic echo cancellation system 201 could comprise any number of loudspeakers 107.

The acoustic echo cancellation system 201 comprises multiple acoustic echo cancellation modules 203A, 203B. In the example of FIG. 6 the acoustic echo cancellation system 201 comprises two acoustic echo cancellation modules 203A, 203B. The acoustic echo cancellation system 201 can comprise more than two acoustic echo cancellation modules 203 in other examples.

The respective acoustic echo cancellation modules 203 are configured to process different input signals. An input signal is provided to each of the acoustic echo cancellation modules 203. The example acoustic echo cancellation system 201 of FIG. 6 is configured so that a first input signal 601 is provided to the first acoustic echo cancellation module 203A and a second input signal 603 is provided to the second acoustic echo cancellation module 203B. The first input signal 601 is based on the loudspeaker signal x_t. The second input signal 603 is obtained by delaying the first input signal 601. The example acoustic echo cancellation system 201 of FIG. 6 comprises a delay module 605 configured to add a delay to the loudspeaker signal x_t to obtain the second input signal 603.

In the example of FIG. 6 there is only one second input signal 603 and there is only one delay module 605. In some examples the acoustic echo cancellation system 201 can comprise multiple second acoustic echo cancellation modules 203B each configured to receive a different second input signal 603. The different second input signals 603 can be delayed by different amounts. In such examples the acoustic echo cancellation system 201 can comprise multiple delay modules 605 configured to add the different delays to the respective signals so as to provide staggered input signals.

The respective acoustic echo cancellation modules 203 comprise a transform module 607 and a set of sub-band filters 609. The first acoustic echo cancellation module 203A comprises a first transform module 607A and a first set of sub-band filters 609A. The second acoustic echo cancellation module 203B comprises a second transform module 607B and a second set of sub-band filters 609B.

The transform modules 607 can be configured to transform the loudspeaker signal x_t, or a delayed loudspeaker signal x_t, from a time domain to a frequency domain. In the example of FIG. 6 the transform modules 607 use an STFT. Other types of transform or WOLA filter-banks could be used in other examples. The same transforms can be used for each of the respective acoustic echo cancellation modules 203.

The transform modules 607 are configured to transform an input signal into a sub-band sequence. The transform modules 607 can be configured to transform an input signal into multiple sub-band sequences. The multiple sub-band sequences can correspond to the multiple frequency bands p=0 ... N−1. The first transform module 607A can be configured to transform the first input signal 601 into a first sub-band sequence or sequences and the second transform module 607B can be configured to transform the second input signal 603 into a second sub-band sequence or sequences.

In the example of FIG. 6 the transform modules 607 can also be configured to apply an oversampling factor. In some examples the oversampling factor could be two. Other oversampling factors could be used in other examples.

The acoustic echo cancellation modules 203 are configured so that the sub-band sequences obtained by the transform modules 607 are then provided to the set of sub-band filters 609. This enables one or more sub-band filters from the set of sub-band filters 609 to be used to process the sub-band sequences. The acoustic echo cancellation modules 203 are configured so that the sub-band sequences from the first transform module 607A is provided to the first set of sub-band filters 609A and the sub-band sequences from the second transform module 607B is provided to the second set of sub-band filters 609B.

The sub-band filters 609 can be based on WOLA filter-banks, STFTs or any other suitable filter-banks or processes.

Different sub-band filters 609 can be used in different acoustic echo cancellation modules 203. The first sub-band filters 609A do not need to be the same as the second sub-band filters 609B. For example, the first sub-band filters 609A can comprise a larger number of coefficients than the second sub-band filters 609B.

The acoustic echo cancellation system 201 can be configured so that the respective input signals 601, 603 can be processed in parallel. That is, the first acoustic echo cancellation module 203A processes the first input signal 601 while the second acoustic echo cancellation module 203B processes the second input signal 603 in parallel.

The acoustic echo cancellation modules 203 provide a prediction signal as an output. The first acoustic echo cancellation module 203 provides a first prediction signal Y_A as an output and the second acoustic echo cancellation 203B provides a second prediction signal Y_B as an output. The prediction signals can be a prediction of the microphone signal or a component of the microphone signal.

The acoustic echo cancellation system 201 is configured to process the first prediction signal Y_A and the second prediction signal Y_B to obtain a predicted echo signal.

The predicted echo signal provides an estimate of the echo within a sub band microphone signal Y. The acoustic echo cancellation system 201 can be configured to perform any suitable process to obtain the predicted echo signal. In some examples the processing of the first prediction signal and the second prediction signal to obtain a predicted echo signal can comprise combining the first prediction signal and the second prediction signal. In some examples the processing of the first prediction signal and the second prediction signal to obtain a predicted echo signal comprises selecting a prediction signal from the outputs of the respective acoustic echo cancellation modules 203. For example, the prediction signal that results in the lowest echo in the output signal could be selected from two more proposed prediction signals.

The acoustic echo cancellation system 201 also comprises one or more microphones 105. Only one microphone is shown in FIG. 6 however the acoustic echo cancellation system 201 could comprise any number of microphones 105. The one or more microphones are 105 configured to detect acoustic signals. The one or more microphones 105 provide an electrical microphone signal y_t as an output where the microphone signal y_t is based on the detected acoustic signals. The microphone signals y_t can comprise a near-end component, a noise component and an echo of the loudspeaker signal x_t and/or any other components.

The acoustic echo cancellation system 201 is configured so that the received microphone signal y_t is provided to a transform module 607. The transform module 607 can be configured to transform the microphone signal y_t, from a time domain to a frequency domain. The microphone signal can be denoted Y in the frequency domain. The signal Y is a sub band microphone signal. In the example of FIG. 6 the transform module 607 comprises an STFT. Other types of transform could be used in other examples. The same transforms that are used in the acoustic echo cancellation modules 203 can be used for the transform of the microphone signal y_t.

In the example of FIG. 6 the transform module 607 can also be configured to apply an oversampling factor to the microphone signal y_t. In some examples the oversampling factor could be two. The oversampling factor is the same as used by the acoustic echo cancellation modules 203. Other oversampling factors could be used in other examples.

The acoustic echo cancellation system 201 can be configured so that the predicted echo signal is applied to the microphone signal Y to reduce the echo from the loudspeaker in the microphone signal Y. This can provide an output signal S with reduced echo. The predicted echo signal could be subtracted from the microphone signal Y to reduce the echo from the loudspeaker in the microphone signal Y. Other methods of processing of the respective signals could be used in other examples.

The acoustic echo cancellation system 201 can be configured so that the output signal S is provided to a sub-band processing module 611. The sub-band processing module 611 can be configured to perform actions such as noise suppression or spatial filtering, or any other suitable action or combination of actions, to the output signal S.

The processed output signal is then provided to an inverse transform module 613. The inverse transform module 613 is configured to apply an inverse transformation to the transform applied by the respective transform modules 607. The inverse transform module 613 can be configured to convert the output signal S from the frequency domain to the time domain. The inverse transform module 613 therefore provides a time domain output signal s_t as an output.

Figure 8:
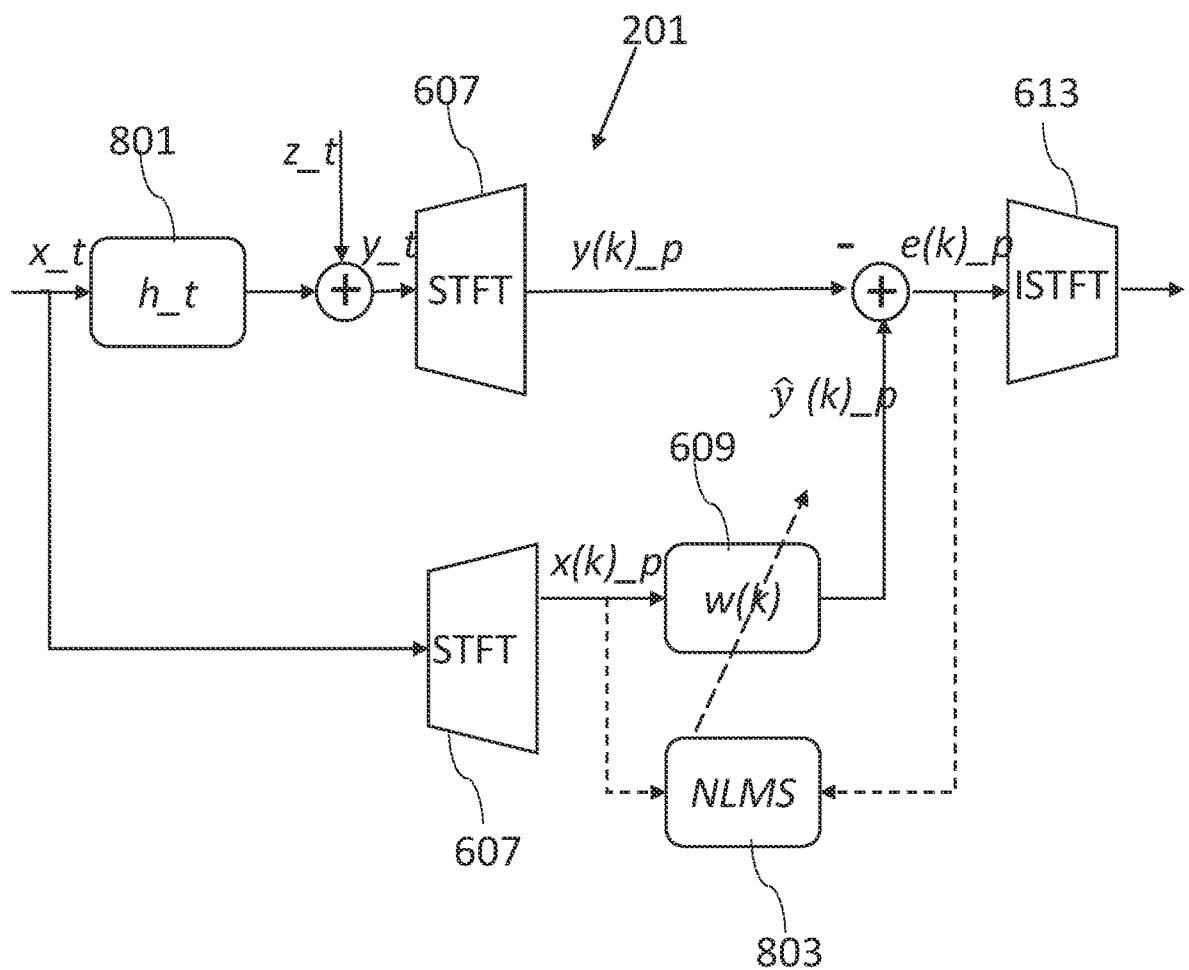
FIG. 8 shows an example acoustic echo cancellation system.
Figure 9:
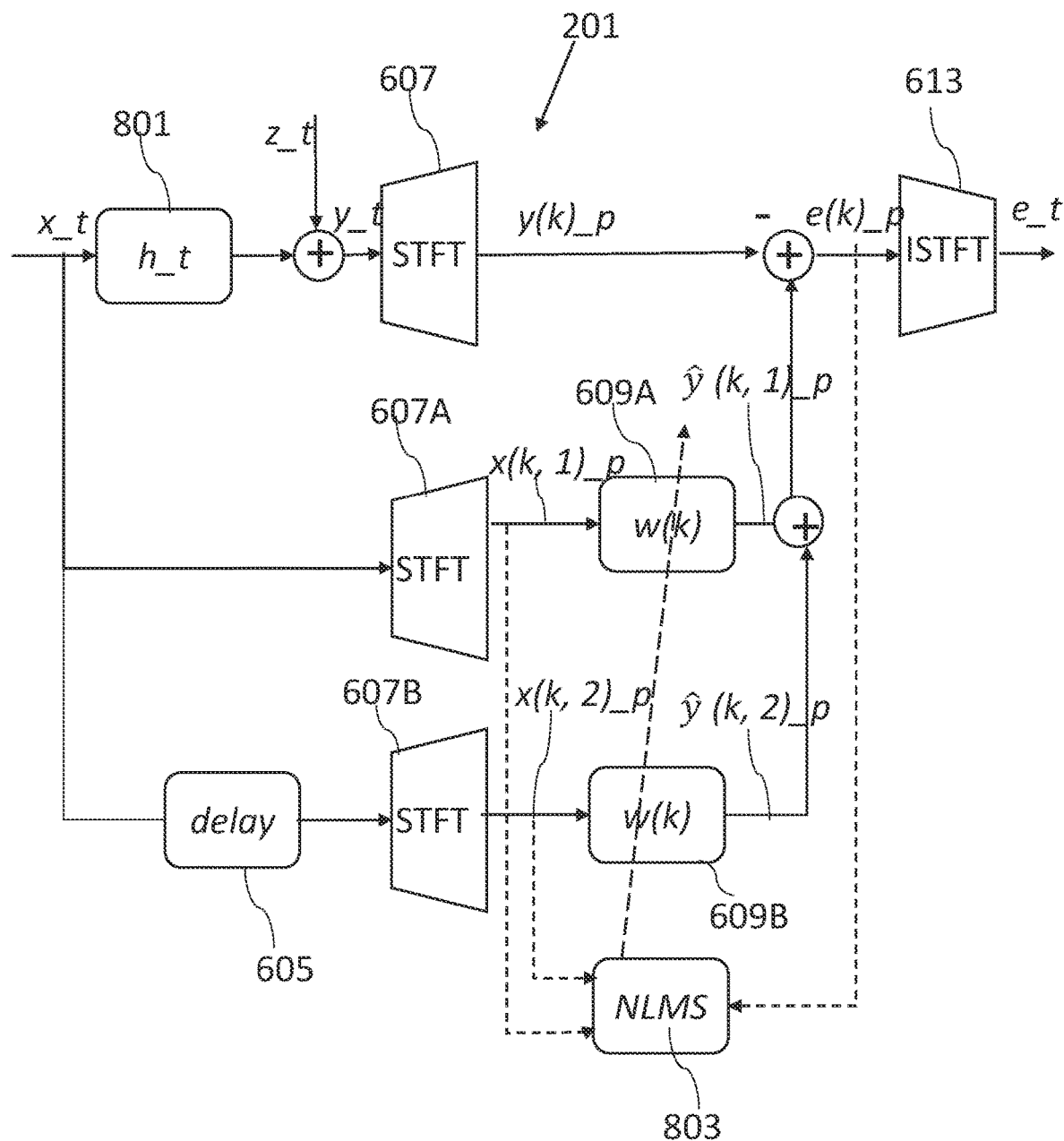
FIG. 9 shows an example acoustic echo cancellation system.
Figure 10:
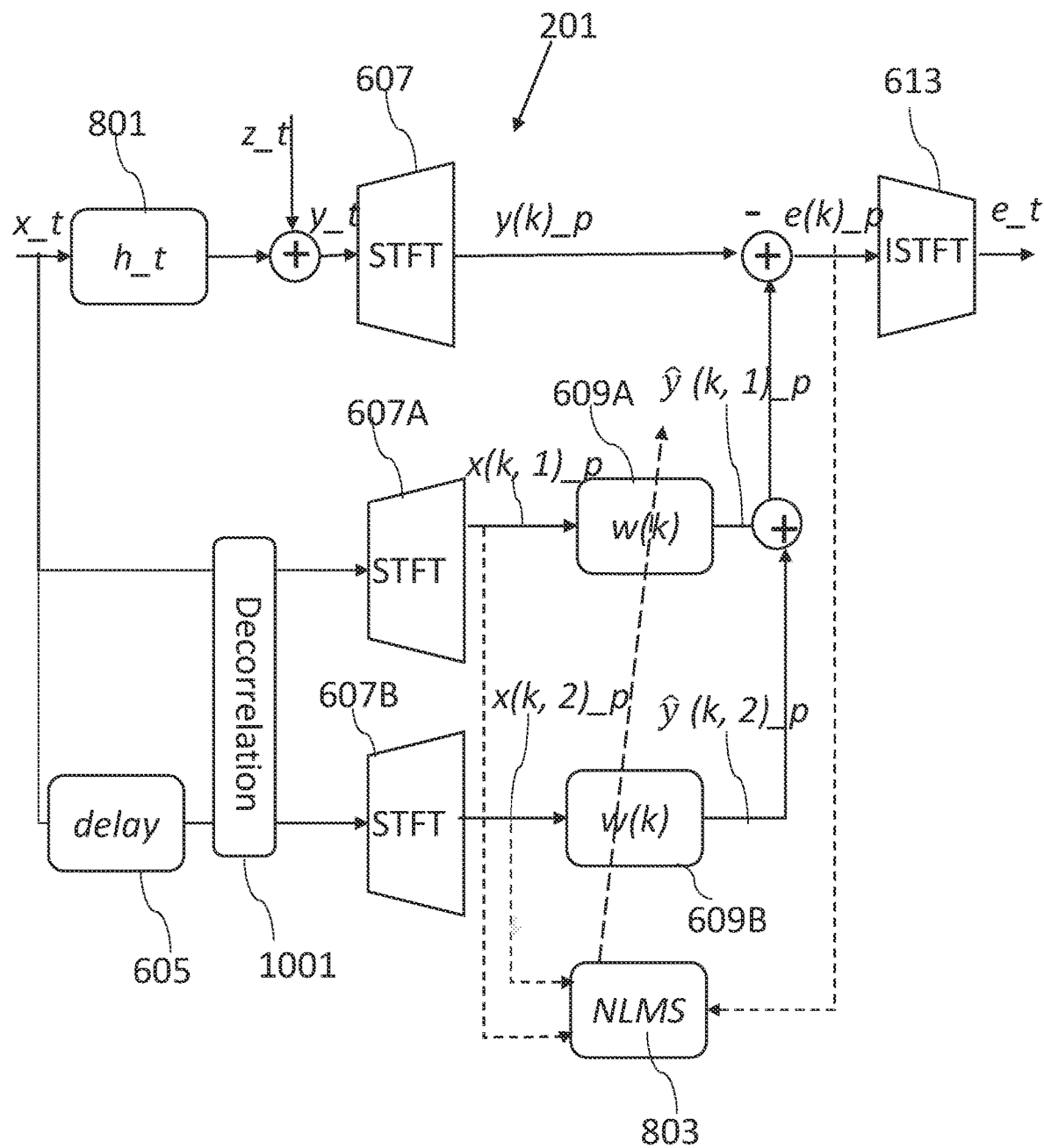
FIG. 10 shows an example acoustic echo cancellation system.

The acoustic echo cancellation modules 203 can be adapted using an adaptive filtering module. The adaptive filtering module is not shown in FIG. 6 for clarity. An example of an adaptive filtering module is shown in FIGS. 8 to 10. The adaptive filtering module is configured to reduce the error in the output signals. The adaptive filtering modules could use an algorithm such as Normalized Least Mean Square (NLMS) or any other suitable algorithm.

FIGS. 7A and 7B show propagation of a speaker impulse through the acoustic echo cancellation system 201 shown in FIG. 6. FIG. 7A shows the propagation of a loudspeaker impulse through an acoustic echo cancellation system 201 having a first physical delay and FIG. 7B shows the propagation of a loudspeaker impulse through an acoustic echo cancellation system 201 having a second physical delay where the first and second physical delays are different lengths.

FIGS. 7A and 7B show a loudspeaker signal 701A, 701B, a physical delay 703A, 703B, a microphone signal 705A, 705B, a first predicted microphone signal 707A, 707B, a second predicted microphone signal 709A, 709B and a residual echo 711A, 711B for each of the respective acoustic echo cancellation systems 201.

The WOLA filter-bank based sub-band filters of the acoustic echo cancellation system 201 in the examples of FIGS. 7A and 7B have a frame length of 5 ms. Other lengths of the frames could be used in other examples. The frames are indicated by the rectangles in FIGS. 7A and 7B.

The predicted microphone signals 707A, 707B, 709A, 709B can be provided by the respective acoustic echo cancellation modules 203. The first predicted microphone signal 707A, 707B can be provided by a first acoustic echo cancellation module 203A. The first acoustic echo cancellation module 203A processes an input signal that has not been delayed. The second predicted microphone signal 709A, 709B can be provided by a second acoustic echo cancellation module 203B. The second acoustic echo cancellation module 203B processes an input signal that has been delayed. In this example the input signal for the second acoustic echo cancellation module 203B has been delayed by half a frame size relative to the input signal for the first acoustic echo cancellation module 203A. In this case the delay block 605 delays the second signal by 2.5 ms. Other delays could be used in other examples.

In FIG. 7A the acoustic echo cancellation system 201 has a physical delay of 5 ms. This is the same as the frame length so an impulse at the beginning of a frame in the loudspeaker signal 701A arrives at the beginning of a frame in the microphone signal 705A.

The sub-band filters of the first acoustic echo cancellation module 203A predict the microphone signal 705A very accurately because the impulses are at the same locations within the frames. However, the sub-band filters of the second acoustic echo cancellation module 203B do not predict the microphone signal 705A very accurately because the added delays cause the impulses to be at different locations within the frames. In the example of FIG. 7A the first predicted microphone signal 707A is similar to the microphone signal 705A but the second predicted microphone signal 709A is different to the microphone signal 705A. The first predicted microphone signal 707A can be selected to be used as the prediction signal because this is the predicted microphone signal that is most similar to the actual microphone signal 705A.

The residual echo 711A is obtained by subtracting the first predicted microphone signal 707A from the microphone signal 705A. The residual echo 711A is low because the first predicted microphone signal 707A is very similar to the microphone signal 705A. This therefore provides an acoustic echo cancellation system 201 that is performing well and has a high ERLE.

In FIG. 7B the acoustic echo cancellation system 201 has a physical delay of 2.5 ms. This is not the same as the frame length. This is about half a frame length so an impulse at the middle of a frame in the loudspeaker signal 701B arrives at the beginning of a frame in the microphone signal 705B.

In this case the sub-band filters of the first acoustic echo cancellation module 203A do not predict the microphone signal 705B very accurately because the impulses are at different locations within the frames. However, the sub-band filters of the second acoustic echo cancellation module 203B do predict the microphone signal 705B accurately because the added delay causes the impulses to be at the same locations within the frames. In the example of FIG. 7B the first predicted microphone signal 707B is different to the microphone signal 705B but the second predicted microphone signal 709B is similar to the microphone signal 705B. The second predicted microphone signal 709B can be selected to be used as the prediction signal because this is the predicted microphone signal that is most similar to the actual microphone signal 705B.

The residual echo 711B is obtained by subtracting the second predicted microphone signal 709B from the microphone signal 705B. The residual echo 711B is low because the second predicted microphone signal 709B is very similar to the microphone signal 705B. This therefore provides an acoustic echo cancellation system 201 that is performing well and has a high ERLE.

Therefore, examples of the disclosure enable a high ERLE to be achieved for different physical delays by using different acoustic echo cancellation modules 203 with staggered delays. In the example of FIGS. 6 to 7B two acoustic echo cancellation modules 203 are used. The acoustic echo cancellation 201 can be extended to comprise more than two acoustic echo cancellation modules 203 where different delays are used for the respective acoustic echo cancellation modules 203.

In the examples of FIGS. 7A and 7B a preferred predicted microphone signal 707, 709 can be selected. In other examples two or more predicted microphone signals 707, 709 can be combined to predict the microphone signal 705. For example, the predicted microphone signals 707, 709 that are output by the respective acoustic echo cancellation modules 203 could be added together. FIG. 9 shows an example system 201 in which the predicted microphone signals 707, 709 that are output by the respective echo cancellation modules 203 are added together. Such embodiments might be useful in real applications where the delay is unlikely to be exactly zero or exactly half a frame size. If the delay is between zero or half a frame size then the predicted microphone signals 707, 709 from the respective echo cancellation modules 203 might have more similar levels of accuracy. In such cases adding the respective signals might provide a more accurate prediction of the microphone signal 705 than selecting one of the outputs of the acoustic echo cancellation modules 203.

FIG. 8 schematically shows an example acoustic echo cancellation system 201 in the STFT domain comprising an adaptive filtering module 803 that can be used to adapt the acoustic echo cancellation modules 203. In the example of FIG. 8 the acoustic echo cancellation system 201 only comprises a single acoustic echo cancellation module.

The acoustic echo cancellation system 201 is configured to receive an input loudspeaker signal x_t. The loudspeaker signal x_t passes through a channel 801. The channel 801 is indicated by h_t in FIG. 8.

A near end signal z_t can be added to the loudspeaker signal x_t after it has passed through the channel 801 to form the microphone signal y_t.

The microphone signal y_t is provided as an input to a transform module 607. The transform module 607 is configured to transform the microphone signal y_t using STFT or any other suitable transforms. The transform module 607 is configured to transform the microphone signal y_t into N sub-band sequences y(k)_p, where k=0, ..., N−1 is the sub-band index and where p is the sequential frame index. The transform module 607 generates frames of length $L=N/\Omega$ at a rate L times lower than the original sampling rate where N is the size of the FFT (Fast Fourier Transform) used by the transform module 607 and $\Omega$ is the oversampling factor of the STFT.

The loudspeaker signal x_t is also provided to a transform module 607 and transformed into sub-band sequences. The transform module 607 is configured to transform the loudspeaker signal x_t into sub-band sequences x(k)_p. The sub-band sequences x(k)_p are provided to a set of sub-band filters 609 to enable the respective sub-band sequences x(k)_p to be convolved with a sub-band filter w(k).

The sub-band filters provide a prediction signal as an output. The prediction signal is indicated ŷ(k)_p where ŷ(k)_p is a prediction of the microphone signal for the sub-band sequences y(k)_p.

The acoustic echo cancellation system 201 is configured to determine the error e(k)_p for the respective sub-bands of the prediction signal ŷ(k)_p. The error e(k)_p can be obtained by subtracting the prediction signal ŷ(k)_p from the microphone signal y(k)_p.

The sub-band errors e(k)_p are then provided to an inverse transform module 613. The inverse transform module 613 is configured to transform the sub-band errors e(k)_p to obtain the time-domain error signal e_t.

The adaptive filtering module 803 is configured to adapt the sub-band filters 609 to minimize the expected error. In an ideal case the sub-band filters 609 can be adapted so that only the near end signal z_t appears in the output signal.

In the example of FIG. 8 an open loop approach is used for the adaptive filtering module 803. In this example an adaptive filtering algorithm is used to adapt the sub-band filters w(k) so as to improve the prediction of the microphone signal y(k)_p. The adaptive filtering algorithm can be used to adapt the sub-band filters w(k) independently of each other. In this example the adaptive filtering module 803 uses a NLMS algorithm. Other algorithms could be used in other examples.

FIG. 9 schematically shows another example acoustic echo cancellation system 201 comprising multiple acoustic echo cancellation modules according to examples of the disclosure. An example adaptive filtering module 803 configured to adapt the respective acoustic echo cancellation modules is shown in FIG. 9.

The acoustic echo cancellation system 201 of FIG. 9 is similar to the acoustic echo cancellation system 201 however an additional transform module 607 and set of sub-band filters 609 are added. The additional transform module 607 and set of sub-band filters 609 provide a second acoustic echo cancellation modules so that loudspeaker signals x_t with staggered delays can be processed in parallel.

The first transform module 607A and the first set of sub-band filters 609A can be as shown in FIG. 8. However, in FIG. 9 the sub-band sequences provided as an output from the first transform module 607A are denoted x(k, 1)_p. Similarly, the first set of sub-band filters 609A are denoted w(k, 1) and the prediction signal output by the first set of sub-band filters 609A is denoted ŷ(k, 1)_p.

In the acoustic echo cancellation system 201 of FIG. 9 the second transform module 607B and the second set of sub-band filters 609B are added in a parallel branch to the first transform module 607A and the first set of sub-band filters 609A.

A delay module 605 is provided in the parallel branch and configured to add a delay to the loudspeaker signal x_t before the delayed loudspeaker signal is provided to the second transform module 607B. The delay added by the delay module 605 is configured to ensure that the signals processed by the respective sets of sub-band filters 609 are staggered.

The delay module 605 can be configured to add a delay of any suitable size. In the example of FIG. 9 the delay module 605 is configured to add a delay of half a frame size.

The sub-band sequences provided as an output from the second transform modules 607A are denoted x(k,2)_p, the second set of sub-band filters 609B are denoted w(k,2) and the prediction signal output by the second set of sub-band filters 609B is denoted ŷ(k,2)_p.

The error e(k)_p is then determined using the respective prediction signals ŷ(k, 1)_p, ŷ(k, 2)_p. The error can be determined by subtracting both of the prediction signals ŷ(k, 1)_p, ŷ(k, 2)_p from the microphone signals y(k)_p.

The adaptive filtering module 803 is configured to adapt the both of the sets of sub-band filters 609A, 609B to minimize the expected error. In an ideal case the sub-band filters 609A, 609B can be adapted so that the expected error approaches zero for each sub-band and only the near end signal z_t appears in the output signal.

In the example of FIG. 9 an open loop approach is used for the adaptive filtering module 803. In this example an adaptive filtering algorithm is used to adapt the sub-band filters w(k) so as to improve the prediction of the microphone signal y(k)_p. The adaptive filtering algorithm can be used to adapt the sub-band filters w(k) independently of each other. In this example the adaptive filtering module 803 uses a NLMS algorithm. Other algorithms could be used in other examples.

In the example of FIG. 9 one additional acoustic echo cancellation module is added and the delay used is half of a frame size. If more than one additional acoustic echo cancellation module is added then different delays could be added so that each of the additional acoustic echo cancellation modules processes an input signal with a different delay. For instance, if two additional acoustic echo cancellation modules are added then the acoustic echo cancellation system 201 will comprise three acoustic echo cancellation modules. In such cases the first acoustic echo cancellation module can be configured to process a signal with zero delay, a second acoustic echo cancellation module can be configured to process a signal with a delay of L/3 (where L is the frame size) and the third acoustic echo cancellation module can be configured to process a signal with a delay of 2L/3. Other numbers of acoustic echo cancellation modules and other sizes of delays could be used in other examples.

FIG. 10 schematically shows another example acoustic echo cancellation system 201 comprising multiple acoustic echo cancellation modules according to examples of the disclosure. The acoustic echo cancellation system 201 of FIG. 10 is similar to the acoustic echo cancellation system 201 of FIG. 9, corresponding references are used for corresponding features.

The acoustic echo cancellation system 201 of FIG. 10 is different to the acoustic echo cancellation system 201 of FIG. 9 in that the acoustic echo cancellation system 201 of FIG. 10 comprises a decorrelation module 1001. In the example of FIG. 10 the decorrelation module 1001 is configured to decorrelate the respective input signals before they are provided to the respective transform modules 607 but after the delays have been added.

The decorrelation module 1001 can configured to apply a transformation block T to a vector comprising the staggered input signals $[x\_1, x\_2]^T$.

The used of the decorrelation module can improve convergence and performance of the acoustic echo cancellation system 201. The addition of the extra acoustic echo cancellation modules creates a virtual stereo acoustic echo cancellation system 201 which will suffer from slow convergence where the signals are spatially correlated. Such spatial correlation could occur in examples of the disclosure if the loudspeaker signal x_t is strongly correlated over the time dimension (with respect to the frame size). The decorrelation module 1001 is therefore configured to decorrelate the input signals so that the outputs x(k, 1)_p, x(k, 2)_p of the respective transform modules 607 are decorrelated.

In the example of FIG. 10 the acoustic echo cancellation system 201 is configured so that the decorrelation is performed on the input signals in the time domain before they are transformed by the respective transform modules 607. In other examples the acoustic echo cancellation system 201 can be configured so that the decorrelation is performed on the input signals in the frequency domain after they have been transformed by the respective transform modules 607.

Any suitable means or processed can be used to determine the transformation block T that is used by the decorrelation module 1001. In some examples the transformation block T can be computed online by tracking the 2×2 covariance matrix of the vector comprising the staggered input signals. In some examples the transformation block T can be computed offline as a fixed matrix.

As an examples, to decorrelate stereo signals that have equal power, a transformation matrix T is given by $$T = \frac{1}{\sqrt{2}}\begin{bmatrix} 1 & 1 \\ 1 & -1 \end{bmatrix}.$$

This transformation decorrelates equal power signals, since $E[(x+y)(x-y)]=E[x^2-y^2]=E[x^2]-E[y^2]=0$. The fixed transformation is effective for use in examples of the disclosure, because the delay added to the input signals does not change the signal power.

Figure 11:
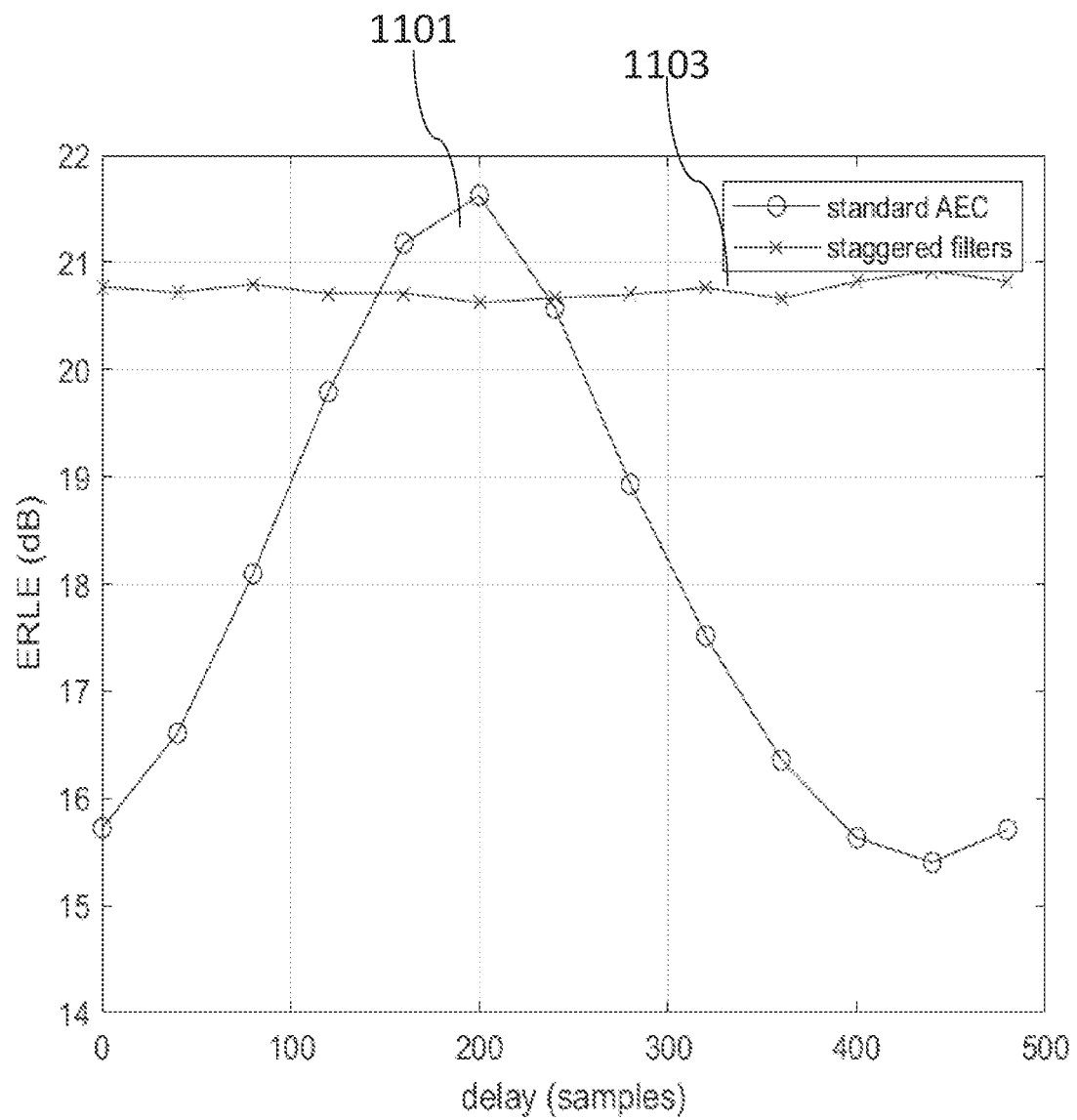
FIG. 11 shows a plot pf ERLE performance for an acoustic echo cancellation system.

FIG. 11 shows a plot pf ERLE performance for an acoustic echo cancellation system 201. The plot of FIG. 11 compares the ERLE for an acoustic echo cancellation system 201 that comprises a single acoustic echo cancellation module 203 and an acoustic echo cancellation system 201 according to examples of the disclosure that comprises two acoustic echo cancellation modules 203 as shown in FIG. 6, 9 or 10.

The results shown in FIG. 11 are calculated for an acoustic echo cancellation system 201 trained on an experimentally measured loudspeaker and microphone signals obtained from a mobile device in an indoor environment.

The first curve 1101 in FIG. 11 is obtained for an acoustic echo cancellation system 201 that comprises a single acoustic echo cancellation module 203. A frame length of 480 and an oversampling factor of 2 were used. The microphone signal was artificially delayed with respect to the loudspeaker signal by a number of samples ranging from 0 to 480. The first curve 1101 shows that the ERLE varies between 16 and 22 dB, depending on the value of this delay.

The second curve 1103 in FIG. 11 is obtained for an acoustic echo cancellation system 201 that comprises two acoustic echo cancellation modules 203 where the input signals for the respective acoustic echo cancellation modules 203 are staggered. As with the first curve, a frame length of 480 and an oversampling factor of 2 were used. The microphone signal was artificially delayed with respect to the loudspeaker signal by a number of samples ranging from 0 to 480. The second curve 1103 shows that the ERLE is consistently close to 21 dB, regardless of the delay that is added. This represents a significant improvement in the robustness of the acoustic echo cancellation system 201 to delay variations.

Figure 12:
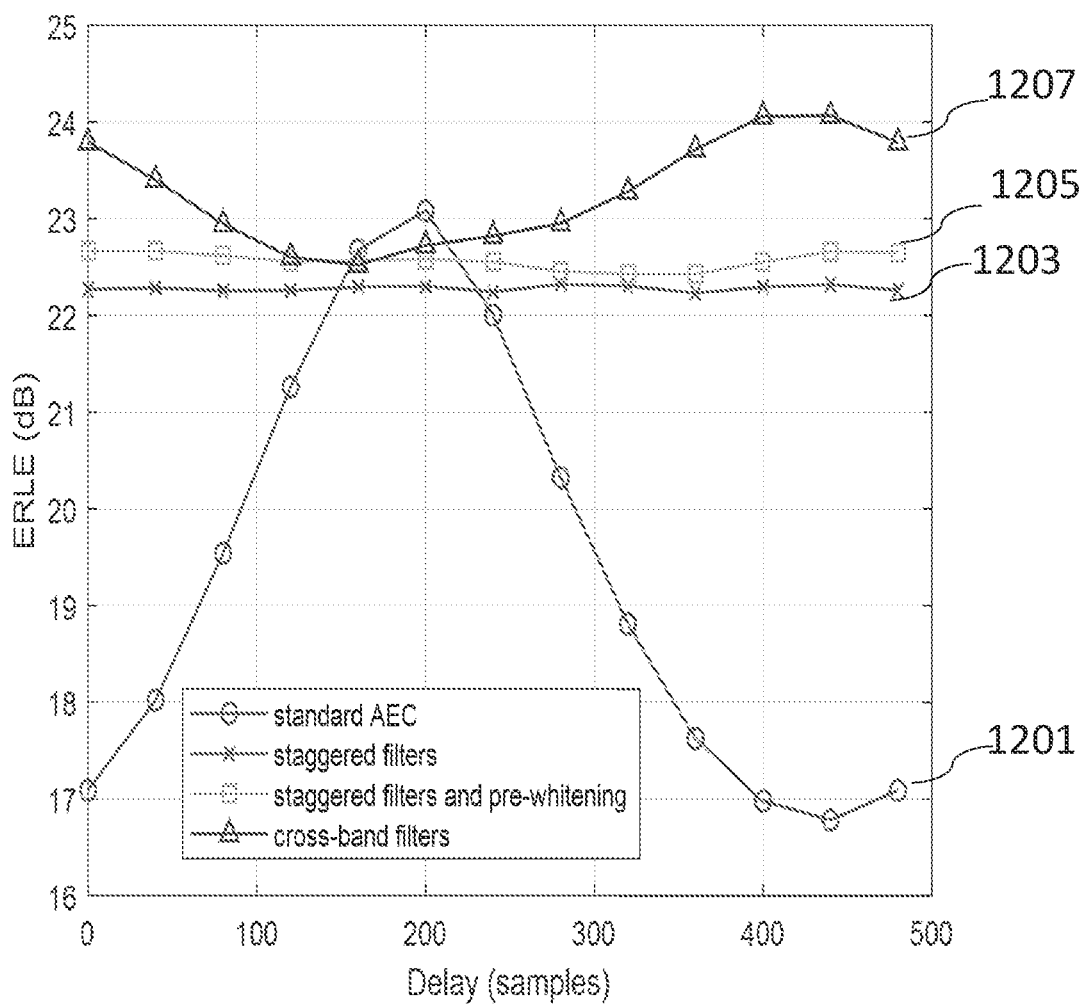
FIG. 12 shows a plot pf ERLE performance for an acoustic echo cancellation system.

FIG. 12 shows a plot of ERLE performance for an acoustic echo cancellation system 201. The plot of FIG. 12 compares the ERLE for different acoustic echo cancellation systems 201.

The results shown in FIG. 12 are calculated for an acoustic echo cancellation system 201 trained on an experimentally measured loudspeaker and microphone signals obtained from a mobile device in an indoor environment.

The first curve 1201 and the second curve 1203 in FIG. 12 are as shown in FIG. 11. The first curve 1201 is obtained for an acoustic echo cancellation system 201 that comprises a single acoustic echo cancellation module 203. The second curve 1203 in is obtained for an acoustic echo cancellation system 201 that comprises two acoustic echo cancellation modules 203 where the input signals for the respective acoustic echo cancellation modules 203 are staggered.

The third curve 1205 in FIG. 12 is obtained for an acoustic echo cancellation system 201 that comprises two acoustic echo cancellation modules 203 where the input signals for the respective acoustic echo cancellation modules 203 are staggered and the input signals are decorrelated. An acoustic echo cancellation system 201 such as that shown in FIG. 10 could be used to decorrelate the input signals.

The third curve 1203 shows that the ERLE is larger when the decorrelation is used compared to the case when decorrelation is not used. This illustrates the more accurate convergence obtained with the decorrelation.

The fourth curve 1207 shows the performance of an acoustic echo cancellation system 201 that used cross-band filtering instead of the additional acoustic echo cancellation modules 203. This curve shows that the use of cross-band filtering achieves high ERLE, but there is some moderate variation of performance in function of the delay value. That is, the ERLE is maximum for delay values where the cross-band aliasing is highest (This is the opposite to the case shown for the first curve).

In some examples of the disclosure the acoustic echo cancellation systems 201 could combine the use of additional acoustic echo cancellation modules 203 and staggered input signals with the use of cross-band filters. The use of the cross-band filters could further improve the performance of the acoustic echo cancellation systems 201 but this would increase the complexity of the systems and could lead to artifacts in the residual echo that sound unnatural.

FIG. 13 schematically illustrates an apparatus 1301 that can be used to implement examples of the disclosure. In this example the apparatus 1301 comprises a controller 1303. The controller 1303 can be a chip or a chip-set. The apparatus 1301 can be provided within a user device 103 as shown in FIG. 1 or any other suitable device.

In the example of FIG. 13 the implementation of the controller 1303 can be as controller circuitry. In some examples the controller 1303 can be implemented in hardware alone, have certain aspects in software including firmware alone or can be a combination of hardware and software (including firmware).

As illustrated in FIG. 13 the controller 1303 can be implemented using instructions that enable hardware functionality, for example, by using executable instructions of a computer program 1309 in a general-purpose or special-purpose processor 1305 that may be stored on a computer readable storage medium (disk, memory etc.) to be executed by such a processor 1305.

The processor 1305 is configured to read from and write to the memory 1307. The processor 1305 can also comprise an output interface via which data and/or commands are output by the processor 1305 and an input interface via which data and/or commands are input to the processor 1305.

The memory 1307 stores a computer program 1309 comprising computer program instructions (computer program code 1311) that controls the operation of the controller 1303 when loaded into the processor 1305. The computer program instructions, of the computer program 1309, provide the logic and routines that enables the controller 1303. to perform the methods illustrated in the accompanying Figs. The processor 1305 by reading the memory 1307 is able to load and execute the computer program 1309.

The apparatus 1301 comprises:
at least one processor 1305; and
at least one memory 1307 storing instructions that, when executed by the at least one processor 1305, cause the apparatus 1301 at least to perform:
  processing 501 a first input signal using a first acoustic echo cancellation module to obtain a first prediction signal, wherein the first input signal is based on a loudspeaker signal;
  processing 503 at least one second input signal using a second acoustic echo cancellation module to obtain a second prediction signal, wherein the at least one second input signal is obtained by delaying the first input signal;
  processing 505 the first prediction signal and the second prediction signal to obtain a predicted echo signal;
  receiving 507 at least one microphone signal;
  applying 509 the predicted echo signal to the received microphone signal to reduce echo from loudspeaker playback in the received microphone signal; and
  adapting 511 the acoustic echo cancellation modules using an adaptive filtering module wherein the adapting of the first acoustic echo cancellation module is based, at least in part, on the predicted echo signal, the received microphone signal, and the first input signal and the adapting of the second acoustic echo cancellation module is based, at least in part, on the predicted echo signal, the received microphone signal, and the second input signal.

As illustrated in FIG. 13, the computer program 1309 can arrive at the controller 1303 via any suitable delivery mechanism 1313. The delivery mechanism 1313 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 1309. The delivery mechanism can be a signal configured to reliably transfer the computer program 1309. The controller 1303 can propagate or transmit the computer program 1309 as a computer data signal. In some examples the computer program 1309 can be transmitted to the controller 1303 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 1309 comprises computer program instructions for causing an apparatus 1301 to perform at least the following or for performing at least the following:
  processing 501 a first input signal using a first acoustic echo cancellation module to obtain a first prediction signal, wherein the first input signal is based on a loudspeaker signal;
  processing 503 at least one second input signal using a second acoustic echo cancellation module to obtain a second prediction signal, wherein the at least one second input signal is obtained by delaying the first input signal;
  processing 505 the first prediction signal and the second prediction signal to obtain a predicted echo signal;
  receiving 507 at least one microphone signal;
  applying 509 the predicted echo signal to the received microphone signal to reduce echo from loudspeaker playback in the received microphone signal; and
  adapting 511 the acoustic echo cancellation modules using an adaptive filtering module wherein the adapting of the first acoustic echo cancellation module is based, at least in part, on the predicted echo signal, the received microphone signal, and the first input signal and the adapting of the second acoustic echo cancellation module is based, at least in part, on the predicted echo signal, the received microphone signal, and the second input signal.

The computer program instructions can be comprised in a computer program 1309, a non-transitory computer readable medium, a computer program product, a machine readable medium. In some but not necessarily all examples, the computer program instructions can be distributed over more than one computer program 1309.

Although the memory 1307 is illustrated as a single component/circuitry it can be implemented as one or more separate components/circuitry some or all of which can be integrated/removable and/or can provide permanent/semi-permanent/dynamic/cached storage.

Although the processor 1305 is illustrated as a single component/circuitry it can be implemented as one or more separate components/circuitry some or all of which can be integrated/removable. The processor 1305 can be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory or memories that work together to cause an apparatus, such as a mobile phone or server, to perform various functions and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 5 can represent steps in a method and/or sections of code in the computer program 1309. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus for acoustic echo cancellation comprising at least one processor; and
at least one memory storing instructions that, when executed by the at least one processor, cause the apparatus at least to perform:
processing a first input signal using a first acoustic echo cancellation module to obtain a first prediction signal, wherein the first input signal is based on a loudspeaker signal;
processing at least one second input signal using a second acoustic echo cancellation module to obtain a second prediction signal, wherein the at least one second input signal is obtained by delaying the first input signal;
processing the first prediction signal and the second prediction signal to obtain a predicted echo signal by selecting one of the first prediction signal or the second prediction signal;
receiving at least one microphone signal;
applying the predicted echo signal to the received microphone signal to reduce echo from loudspeaker playback in the received microphone signal; and
adapting the acoustic echo cancellation modules using an adaptive filtering module wherein the adapting of the first acoustic echo cancellation module is based, at least in part, on the predicted echo signal, the received microphone signal, and the first input signal and the adapting of the second acoustic echo cancellation module is based, at least in part, on the predicted echo signal, the received microphone signal, and the second input signal.

2. An apparatus as claimed in claim 1 wherein the at least one memory also stores instructions that, when executed by the at least one processor, cause the apparatus at least to perform processing the first input signal and the second input signal in parallel.

3. An apparatus as claimed in claim 1 wherein the first acoustic echo cancellation module comprises a first set of sub-band filters and the second acoustic echo cancellation module comprises a second set of sub-band filters.

4. An apparatus as claimed in claim 3 wherein the at least one memory also stores instructions that, when executed by the at least one processor, cause the apparatus at least to perform obtaining a sub-band sequence of the first input signal and processing the sub-band sequence of the first input signal using a sub-band filter from the first set of sub-band filters and obtaining a sub-band sequence of the second input signal and processing the sub-band sequence of the second input signal using a sub-band filter from the second set of sub-band filters.

5. An apparatus as claimed in claim 4 wherein the at least one memory also stores instructions that, when executed by the at least one processor, cause the apparatus at least to perform using a first transform to transform the first input signal into the sub-band sequence of the first input signal and using a second transform to transform the second input signal into the sub-band sequence of the second input signal.

6. An apparatus as claimed in claim 3 wherein the sub-band filters are based on at least one of:
adaptive weighted overlap add filter-banks; or
short time Fourier transforms.

7. An apparatus as claimed in claim 1 wherein the at least one second input signal is delayed by half a frame of the acoustic echo cancellation module compared to the first input signal.

8. An apparatus as claimed in claim 1 wherein the at least one memory also stores instructions that, when executed by the at least one processor, cause the apparatus at least to perform obtaining a plurality of second input signals wherein different delays are used for the different second input signals.

9. An apparatus as claimed in claim 1 wherein the first acoustic echo cancellation module comprises a larger number of coefficients than the second acoustic echo cancellation module.

10. An apparatus as claimed in claim 1 wherein the at least one memory also stores instructions that, when executed by the at least one processor, cause the apparatus at least to perform decorrelating the first input signal and the at least one second input signal before the respective signals are provided to the respective acoustic echo cancellation modules.

11. An apparatus as claimed in claim 1 wherein the loudspeaker signal comprises a multi-channel signal.

12. A method comprising:
processing a first input signal using a first acoustic echo cancellation module to obtain a first prediction signal, wherein the first input signal is based on a loudspeaker signal;
processing at least one second input signal using a second acoustic echo cancellation module to obtain a second prediction signal, wherein the at least one second input signal is obtained by delaying the first input signal;
processing the first prediction signal and the second prediction signal to obtain a predicted echo signal by selecting one of the first prediction signal or the second prediction signal;
receiving at least one microphone signal;
applying the predicted echo signal to the received microphone signal to reduce echo from loudspeaker playback in the received microphone signal; and
adapting the acoustic echo cancellation modules using an adaptive filtering module wherein the adapting of the first acoustic echo cancellation modulation is based, at least in part, on the predicted echo signal, the received microphone signal, and the first input signal and the adapting of the second acoustic echo cancellation modulation is based, at least in part, on the predicted echo signal, the received microphone signal, and the second input signal.

13. A method as claimed in claim 12 wherein the first input signal and the second input signal are processed in parallel.

14. A computer program product comprising a non-transitory computer-readable storage medium having instructions which, when executed by an apparatus, cause the apparatus to perform at least:
processing a first input signal using a first acoustic echo cancellation module to obtain a first prediction signal, wherein the first input signal is based on a loudspeaker signal;
processing at least one second input signal using a second acoustic echo cancellation module to obtain a second prediction signal, wherein the at least one second input signal is obtained by delaying the first input signal;

processing the first prediction signal and the second prediction signal to obtain a predicted echo signal by selecting one of the first prediction signal or the second prediction signal;

receiving at least one microphone signal;

applying the predicted echo signal to the received microphone signal to reduce echo from loudspeaker playback in the received microphone signal; and adapting the acoustic echo cancellation modules using an adaptive filtering module wherein the adapting of the first acoustic echo cancellation modulation is based, at least in part, on the predicted echo signal, the received microphone signal, and the first input signal and the adapting of the second acoustic echo cancellation modulation is based, at least in part, on the predicted echo signal, the received microphone signal, and the second input signal.

\* \* \* \* \*